(12) United States Patent
Gysling et al.

(10) Patent No.: US 11,105,707 B2
(45) Date of Patent: Aug. 31, 2021

(54) INDUCING AND MONITORING A VIBRATORY RESPONSE IN A COMPONENT

(71) Applicant: United Technologies Corporation, Farmington, CT (US)

(72) Inventors: Daniel L. Gysling, South Glastonbury, CT (US); Joseph V. Paturzo, Avon, CT (US); Richard A. Lomenzo, Enfield, CT (US); Allison Nicklous, Old Saybrook, CT (US); Zaffir A. Chaudhry, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/799,281

(22) Filed: Feb. 24, 2020

(65) Prior Publication Data

US 2020/0209102 A1  Jul. 2, 2020

Related U.S. Application Data

(63) Continuation-in-part of application No. 15/790,892, filed on Oct. 23, 2017, now Pat. No. 10,571,361.

(51) Int. Cl.
*G01M 7/02* (2006.01)
*G01M 13/005* (2019.01)
*G01M 15/14* (2006.01)

(52) U.S. Cl.
CPC ............ *G01M 7/022* (2013.01); *G01M 7/025* (2013.01); *G01M 7/027* (2013.01); *G01M 13/005* (2013.01); *G01M 15/14* (2013.01)

(58) Field of Classification Search
CPC ........ G01M 7/00; G01M 7/022; G01M 7/025; G01M 7/027; G01M 7/06; G01M 7/08; G01M 13/00; G01M 13/005; G01M 15/00; G01M 15/14; B23P 6/00; B23P 25/00
See application file for complete search history.

(56) References Cited

U.S. PATENT DOCUMENTS

| 3,374,662 A | 3/1968 | Achter |
| 3,495,447 A | 2/1970 | Conniff |
| 3,536,940 A | 10/1970 | Colletti |
| 4,073,600 A | 2/1978 | Doman |

(Continued)

FOREIGN PATENT DOCUMENTS

GB        946589 A     1/1964

OTHER PUBLICATIONS

EP Office Action for EP18201860.6 dated Jun. 2, 2021.

*Primary Examiner* — Suman K Nath
(74) *Attorney, Agent, or Firm* — Getz Balich LLC

(57) ABSTRACT

A system is provided for testing a component. This system includes a support structure, an excitation system and a sensor system. The support structure is configured to support the component. The excitation system includes a plurality of excitation devices arranged in an array. The plurality of excitation devices at least include a first excitation device, a second excitation device and a third excitation device. The excitation system is configured to respectively control each of the plurality of excitation devices to excite a vibratory response in the component. The sensor system is configured to output data indicative of the vibratory response.

12 Claims, 8 Drawing Sheets

(56) References Cited

U.S. PATENT DOCUMENTS

| | | |
|---|---|---|
| 4,445,381 A | 5/1984 | Russenberger |
| 4,475,385 A | 10/1984 | Farmer |
| 5,206,816 A | 4/1993 | Hill |
| 5,226,326 A * | 7/1993 | Polen .................... G01N 29/12 73/571 |
| 5,239,864 A | 8/1993 | Von Pragenau |
| 6,023,116 A | 2/2000 | Kiyotaka |
| 6,195,982 B1 | 3/2001 | Gysling |
| 6,339,878 B1 | 1/2002 | Owen |
| 6,377,900 B1 | 4/2002 | Ueno |
| 6,582,183 B2 | 6/2003 | Eveker |
| 6,584,849 B2 | 7/2003 | Loftus |
| 7,383,136 B1 | 6/2008 | Griffin |
| 7,509,862 B2 | 3/2009 | Cohen |
| 8,313,280 B2 | 11/2012 | Hurwitz |
| 8,600,707 B1 | 12/2013 | El-Aini |
| 8,646,251 B2 | 2/2014 | Rosenkrans |
| 2009/0261665 A1 | 10/2009 | Wang |
| 2010/0167620 A1 | 7/2010 | Jackson |
| 2011/0233871 A1 | 9/2011 | Davis |
| 2012/0102701 A1 | 5/2012 | Borufka |
| 2012/0323517 A1 * | 12/2012 | Pado .................... G01N 29/326 702/104 |
| 2014/0331789 A1 | 11/2014 | Shimoyama |
| 2017/0276020 A1 * | 9/2017 | Lee ......................... B64F 5/60 |
| 2018/0149162 A1 | 5/2018 | Nicklous |

* cited by examiner

INDUCING AND MONITORING A VIBRATORY RESPONSE IN A COMPONENT

CROSS-REFERENCE TO RELATED APPLICATIONS

This application is a continuation-in-part of and claims priority to U.S. patent application Ser. No. 15/790,892 filed Oct. 23, 2017, which is hereby incorporated herein by reference in its entirety.

BACKGROUND OF THE DISCLOSURE

1. Technical Field

This disclosure relates generally to systems and methods for testing a component and, more particularly, to inducing and monitoring a vibratory response in a component of, for example, a gas turbine engine.

2. Background Information

Various systems and methods are known in the art for testing and monitoring dynamic responses in a component of, for example, a gas turbine engine. While these known systems and methods have various advantages, there is still room in the art for improvement. For example, there is a need in the art for systems and methods for inducing and monitoring a vibratory response in a component such as, for example, a gas turbine engine seal element.

SUMMARY OF THE DISCLOSURE

According to an aspect of the present disclosure, a system is provided for testing a component. This system includes a support structure, an excitation system and a sensor system. The support structure is configured to support the component. The excitation system includes a plurality of excitation devices arranged in an array and configured for rigid connection to the component. The plurality of excitation devices at least include a first excitation device, a second excitation device and a third excitation device. The excitation system is configured to respectively control each of the plurality of excitation devices to excite a vibratory response in the component. The sensor system is configured to output data indicative of the vibratory response.

According to another aspect of the present disclosure, a system is provided for testing a component. This system includes a support structure, an excitation system and a sensor system. The support structure is configured to support the component. The excitation system includes a plurality of excitation devices arranged in an array and configured to excite a vibratory response in the component. The plurality of excitation devices at least include a first excitation device, a second excitation device and a third excitation device. The excitation system is configured to respectively control each of the plurality of excitation devices to excite the vibratory response in the component. The sensor system is configured to output data indicative of the vibratory response.

According to still another aspect of the present disclosure, a method is provided for testing a component. During this method, the component is arranged with an excitation system that includes a plurality of excitation devices. The plurality of excitation devices are arranged in an array about the component after the arranging. The plurality of excitation devices at least include a first excitation device, a second excitation device and a third excitation device. A vibratory response is excited in the component by operating the excitation system to respectively control vibrations induced in the component by each of the plurality of excitation devices. Data is output indicative of the vibratory response from a sensor system.

The data may be processed with a computer system to determine at least one of a structural characteristic or a dynamic response characteristic of the component.

The operating of the excitation system to control the vibrations induced in the component by each of the plurality of excitation devices may include varying strength, frequency and/or phase of the vibrations induced by the first excitation device according to a function.

The operating of the excitation system to control the vibrations induced in the component by each of the plurality of excitation devices may include varying strength, frequency and/or phase of the vibrations induced by the second excitation device according to the function. The varying of the strength, the frequency and/or the phase of the vibrations induced by the first excitation device may be out of phase with the varying of the strength, the frequency and/or the phase of the vibrations induced by the second excitation device.

The first excitation device may be configured as or otherwise include an electroacoustic transducer configured for rigid connection to the component.

The first excitation device may be configured as or otherwise include a piezoelectric device configured for rigid connection to the component.

The first excitation device may be configured as or otherwise include a permanent magnet associated with an electromagnet. The permanent magnet may be configured for rigid connection to the component. The excitation system may be configured to control interaction between the electromagnet and the permanent magnet during excitation of the vibratory response.

The sensor system may include a plurality of sensors arranged in an array and configured for rigid connection to the component. The sensors may be configured to sense the vibratory response of the component.

The plurality of sensors may include an accelerometer, a strain gage, a pressure transducer, a microphone, a thermocouple, a mass flow meter and/or a proximity probe.

The support structure may include a mount for rigidly attaching the component to the support structure.

A stationary base structure may be included. The support structure may be attached to the stationary base structure through a compliant connection.

The excitation system may be configured to change at least one parameter associated with vibrations induced in the component by at least one of the plurality of excitation devices according to a function.

The at least one parameter may include at least one of strength of the vibrations, phase of the vibrations or frequency of the vibrations.

The function may be a sinusoidal function.

The excitation system may be configured to vary one or more parameters of vibrations induced by the first excitation device according to a first function. The excitation system may be further configured to vary one or more parameters of vibrations induced by the second excitation device according to a second function. The varying of the one or more parameters of the vibrations induced by the first excitation device may be out of phase with the varying of the one or more parameters of the vibrations induced by the second excitation device.

The one or more parameters may include at least one of strength of the vibrations, phase of the vibrations or frequency of the vibrations.

The first function may be equal to the second function.

The excitation system may be further configured to vary one or more parameters of vibrations induced by the third excitation device according to a third function. The varying of the one or more parameters of the vibrations induced by the first excitation device may be in phase with the varying of the one or more parameters of the vibrations induced by the third excitation device.

The excitation system may be further configured to vary one or more parameters of vibrations induced by the third excitation device according to a third function. The varying of the one or more parameters of the vibrations induced by the third excitation device may be out of phase with the varying of the one or more parameters of the vibrations induced by the first excitation device and the varying of the one or more parameters of vibrations induced by the second excitation device.

The foregoing features and the operation of the invention will become more apparent in light of the following description and the accompanying drawings.

DETAILED DESCRIPTION

The present disclosure includes systems and methods for testing at least one component. An example of such a component is a stationary seal land (e.g., a carbon seal) for a lift off seal system of a gas turbine engine such as, but not limited to, a turbofan gas turbine engine or a turbojet gas turbine engine. The present disclosure, however, is not limited to testing such an exemplary component. For example, the component may alternatively be another stationary component or structure of the gas turbine engine; e.g., a vane airfoil, a vane array, a case, etc. In another example, the component may be configured as a movable component or structure of the gas turbine engine (e.g., a rotor blade, a rotor disk, a shaft, rotating seal element such as a knife-edge seal element, etc.) where that component is tested, for example, when stationary in a laboratory setting. Of course, the systems and methods of the present disclosure may also test component(s) for other types of rotational equipment as well as component(s) for non-rotational equipment components. For ease of description, however, the component being monitored may be described below as the stationary seal land.

Figure 1:
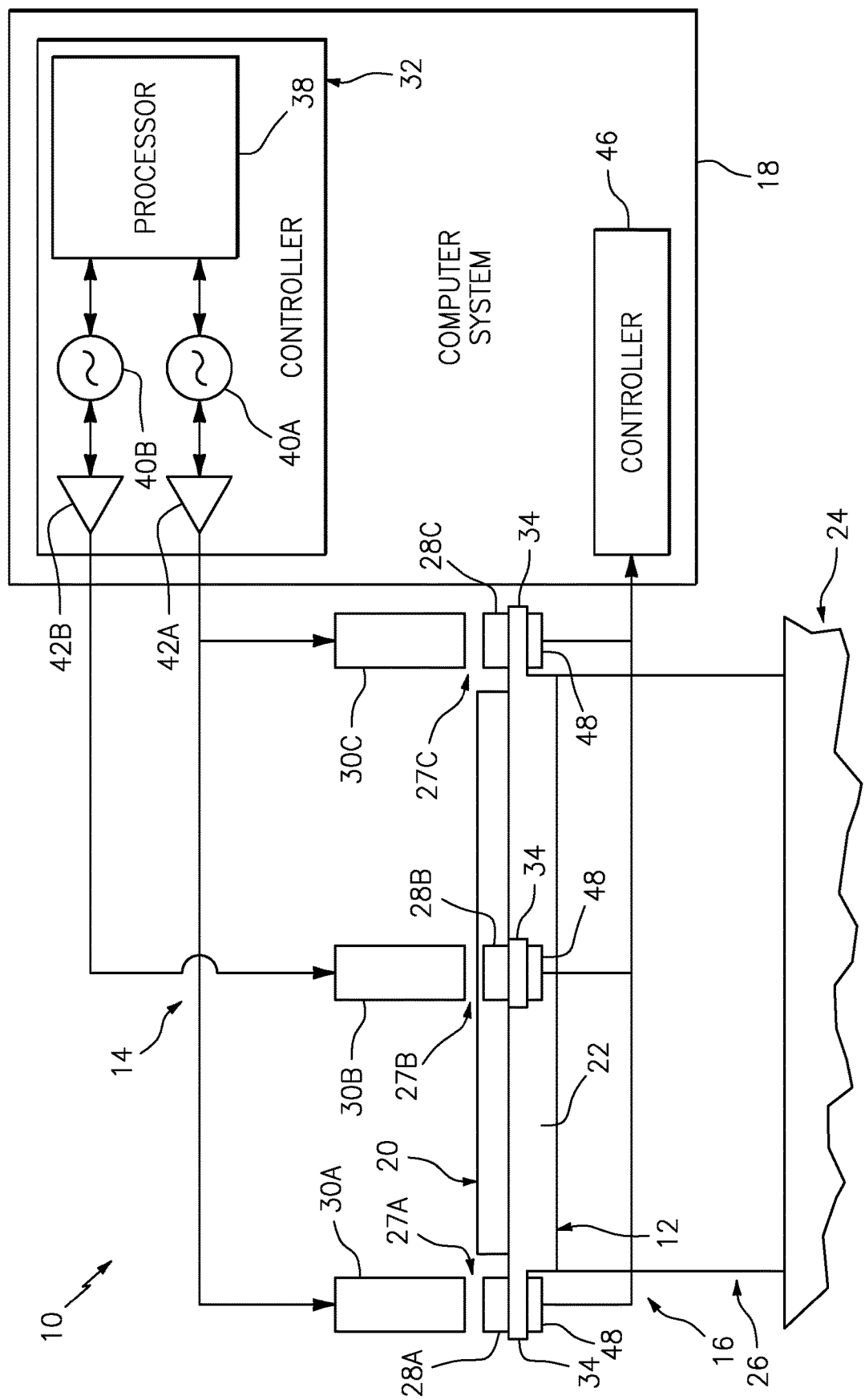
FIG. 1 is a schematic illustration of a system for testing a component such as, for example, a seal element.

FIG. 1 is a schematic illustration of an exemplary system 10 for testing the component 20. This testing system 10 includes a support structure 12, a vibration excitation system 14, a sensor system 16 and a computer system 18.

The support structure 12 is configured to support the component 20 during the testing thereof. The support structure 12 of FIG. 1, for example, is configured to receive the component 20 and rigidly hold/secure the component 20 therewith. The term "rigid" may be used herein to describe an (e.g., direct or indirect) engagement between two components where those two components (A) do not move relative to one another and (B) are operable to transfer vibrations and/or other loads therebetween with substantially no transmission loss; e.g., less than 0.5 to 3 percentage transmission loss. The support structure 12, for example, may include one or more mounts (e.g., clamps, fasteners, etc.) that fixedly (e.g., immovably) attach the component 20 to a base 22 of the support structure 12. In another example, the component 20 may also or alternatively be adhered (e.g., epoxied, glued), brazed, welded or otherwise bonded to the support structure 12.

The support structure 12 of FIG. 1 is connected to a stationary base structure 24 of the testing system 10. This connection between the support structure 12 and the stationary base structure 24 may be a flexible/compliant connection. The support structure 12 of FIG. 1, for example, may be attached to the stationary base structure 24 through a spring system 26 (or springs). This spring system 26 is mounted between the support structure 12 and the stationary base structure 24. The spring system 26 and, more generally, the compliant connection enable the support structure 12 and the component 20 rigidly attached thereto to move (e.g., vibrate) during the testing as described below in further detail. The present disclosure, however, is not limited to the foregoing exemplary compliant connection.

Figure 2:
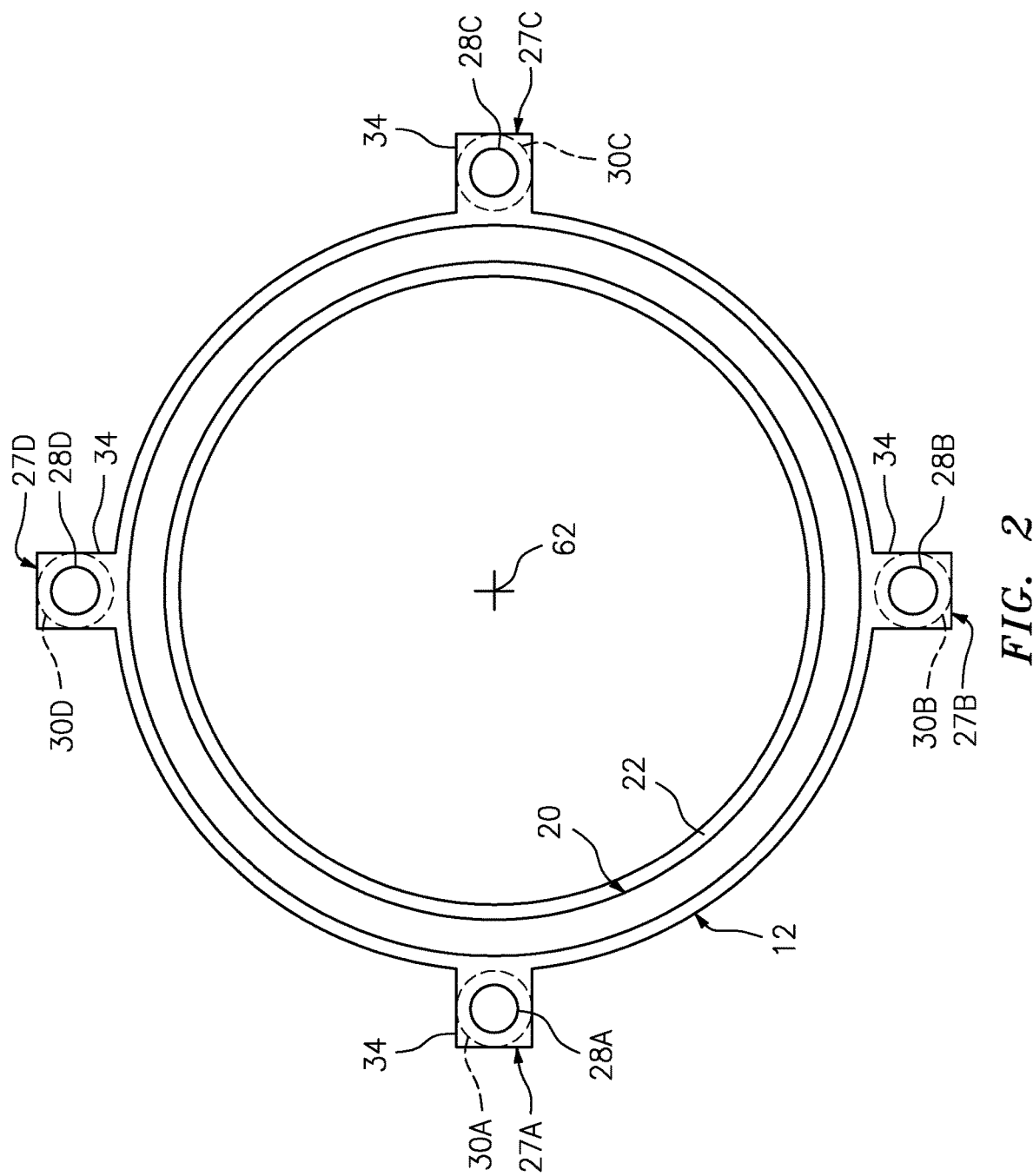
FIG. 2 is a diagrammatic illustration of a portion of the testing system of FIG. 1, where out of view electromagnets are shown by dashed lines.

Referring to FIGS. 1 and 2, the excitation system 14 includes a plurality of excitation devices 27A-D (generally referred to as "27"). These excitation devices 27 may include a plurality of permanent magnets 28A-D (generally referred to as "28") and a plurality of electromagnets 30A-D (generally referred to as "30"). More particularly, each excitation device 27 may include a respective one of the permanent magnets 28 and a respective one of the electromagnets 30. The excitation system also includes a controller 32 configured in signal communication with each of the excitation devices 27.

The permanent magnets 28 are arranged in an (e.g., annular) array. For example, the permanent magnets 28 are respectively arranged at discrete locations circumferentially about the base 22 of the support structure 12. The permanent magnets 28 are configured for rigid connection to the component 20. Each of the permanent magnets 28, for example, is fixedly attached (e.g., bonded) to a respective tab 34 of the support structure 12, which tab 34 projects (e.g., radially) out from an outer periphery of the base 22. In the specific embodiment of FIGS. 1 and 2, the permanent magnets 28 are disposed on the same side of the support structure 12 as the component 20; however, the present disclosure is not limited to such an exemplary arrangement.

The electromagnets 30 are also respectively arranged at discrete locations circumferentially about the base 22 of the support structure 12. These electromagnets 30 may be fixedly and rigidly connected to the stationary base structure 24 via a plurality of mounts 36; e.g., see FIG. 3. Each of the electromagnets 30 is associated with a respective one of the permanent magnets 28. This association enables each of the electromagnets 30 to be magnetically engaged with a respective one of the permanent magnets 28 during the testing of the component 20. Each of the electromagnets 30, for example, may be located proximate (e.g., adjacent but not touching) a respective one of the permanent magnets 28. Each of the electromagnets 30 of FIG. 1 is also substantially aligned (e.g., coaxial) with a respective one of the permanent magnets 28.

Figure 4:
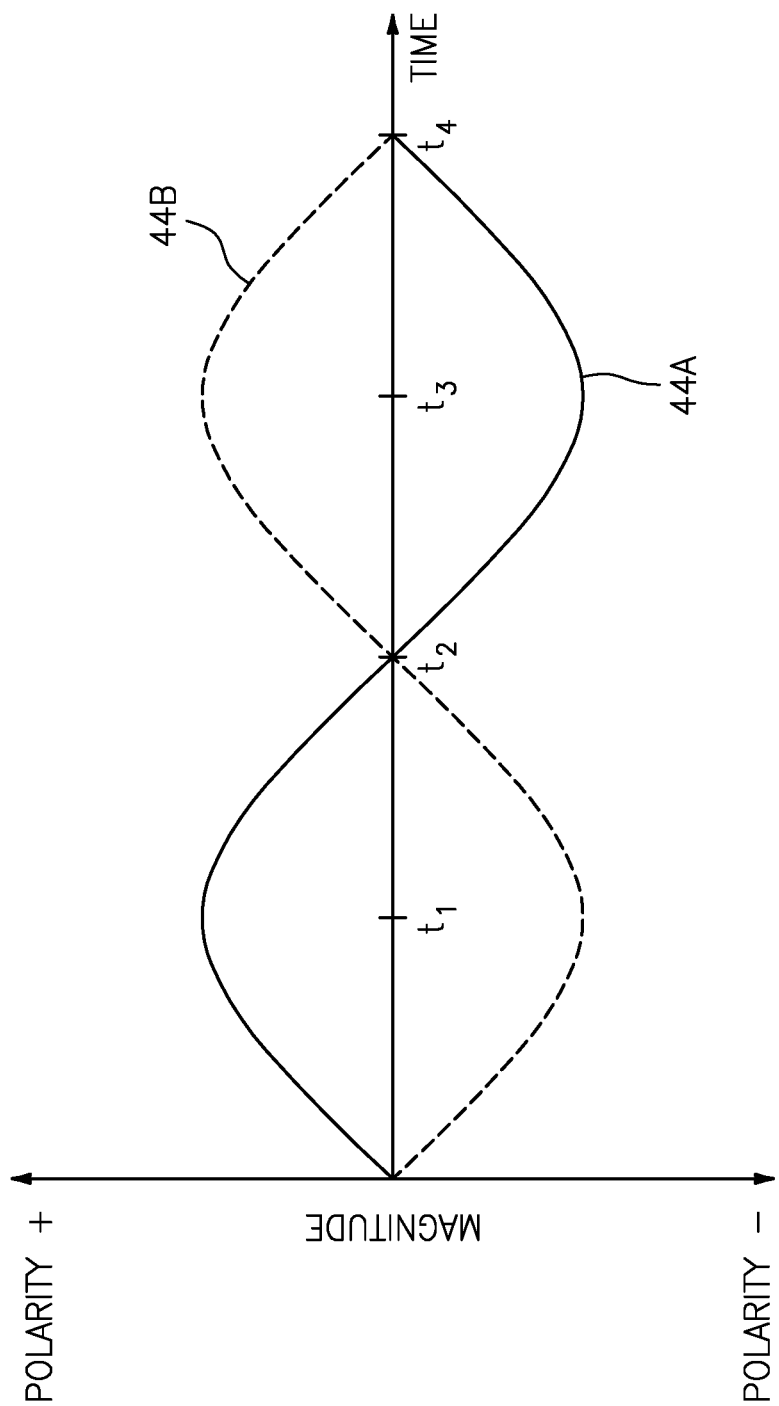
FIG. 4 is a graph illustrating signal magnitude versus time for first and second control signals.

The controller 32 is configured in signal communication with each of the electromagnets 30. The controller 32 of FIG. 1 includes a processor 38, one or more signal generators 40A and 40B (e.g., oscillator(s)) and one or more signal amplifiers 42A and 42B; of course, in other embodiments, the signal amplifiers 42A and 42B may be configured discrete from the controller 32. The processor 38 is configured to cause each signal generator 40A, 40B to generate a control signal 44A, 44B (see FIG. 4) according to a function such as, but not limited to, a sinusoidal function. The first control signal 44A generated by the first signal generator 40A may be out of phase (e.g., completely opposite or otherwise phase shifted from) the second control signal 44B generated by the second signal generator 40B as shown, for example, in FIG. 4. The first control signal 44A is amplified by the first amplifier 42A, and then directed to a subset of one or more the electromagnets 30; e.g., the diametrically opposed electromagnets 30A and 30C of FIG. 2. Similarly, the second control signal 44B is amplified by the second amplifier 42B, and then directed to another subset of one or more of the electromagnets 30; e.g., the diametrically opposed electromagnets 30B and 30D of FIG. 2.

The control signals 44A and 44B are received by the electromagnets 30 and cause the electromagnets 30 to respectively generate magnetic fields with changing/varying strengths and/or frequency and/or phases. Briefly, for oscillatory excitation, changing the phase of the electromagnetic field generated by the electromagnets by one-hundred and eight degrees may be considered herein to be equivalent to changing a polarity of the electromagnetic. The varying magnetic fields respectively interact with magnetic fields produced by the permanent magnets 28, which interaction may excite a vibratory response in the component 20 as described below in further detail. The excitation system 14 is thereby configured to control interaction between the electromagnets 30 and the permanent magnets 28 to excite the vibratory response in the component 20.

Referring to FIG. 1, the sensor system 16 is configured to generate and output data indicative of the vibratory response in the component 20. The sensor system 16 of FIG. 1, for example, includes a controller 46 and one or more sensors 48. Examples of the sensors 48 include, but are not limited to, accelerometers, strain gages, pressure transducers, microphones, thermocouples, mass flow meters, proximity probes or any other devices which may be used to sense vibrations and/or conditions associated with (e.g., that result from) vibrations. The sensors 48 may have a common configuration. For example, each sensor 48 may be configured as one of the afore-listed sensor types; e.g., an accelerometer. Alternatively, the sensors 48 may have different configurations. For example, the sensors may include two or more of the afore-listed sensor types.

The sensors 48 are arranged in an (e.g., annular) array. For example, the sensors 48 are respectively arranged at discrete locations circumferentially about the base 22 of the support structure 12. The sensors 48 may be configured for rigid connection to the component 20. Each of the sensors 48, for example, may be fixedly attached (e.g., bonded) to a respective tab 34 of the support structure 12, on an opposite side of the tab 34 from a respective permanent magnet 28.

The controller 46 is in signal communication with each of the sensors 48. The controller 46 receives output signals from each of the sensors 48 and converts data from those output signals into output data, which output data is indicative of the vibratory response of the component 20.

The computer system 18 may be configured to include or otherwise implement (via hardware and/or software) part or all of the excitation system controller 32 and part or all of the sensor system controller 46 as shown in FIG. 1. However, in other embodiments, the computer system 18 may be a standalone system from the excitation system controller 32 and/or the sensor system controller 46. The computer system 18 is configured to process the data output from the sensor system 16 to determine one or more structural characteristics of the component 20 and/or one or more dynamic characteristics of the component 20. Using known algorithms, for example, the computer system 18 may process the output data to determine the natural frequency of the component 20, the component's damping characteristics and/or the component's modes of vibration. In addition or alternatively the computer system 18 may process the output data to determine frequency, damping and/or mode shape of the vibrations. The computer system 18 may also or alternatively process the output data to compare the sensed (actual) vibratory response of the component 20 to a predicted vibratory response of the component 20 and provide comparison data indicative thereof.

In addition to the foregoing, the computer system 18 may also be configured to monitor rotation of a rotating assembly 50 of the testing system 10; e.g., sense, display and/or record rotational speed of one or more components of the rotating assembly 50. The rotating assembly 50 of FIG. 3 includes a shaft 52 and a rotor 54 (e.g., a lift off seal element) connected to the shaft 52. The shaft 52 is mechanically coupled to a motor 56, which is in signal communication with the computer system 18. The motor 56 is configured to drive rotation of the rotor 54 through the shaft 52. The rotor 54 may be configured to sealingly engage the component 20 such that these components 20 and 54 form, for example, a lift off seal system.

The excitation system 14 may have configurations different than that described above. For example, referring to FIGS. 5A and 6, each excitation device 27 may alternatively be configured as or otherwise include an electroacoustic transducer (e.g., a speaker), a piezoelectric device (e.g., a piezoelectric patch) or any other device/devices capable of inducing vibrations in the component 20.

Figure 5A:
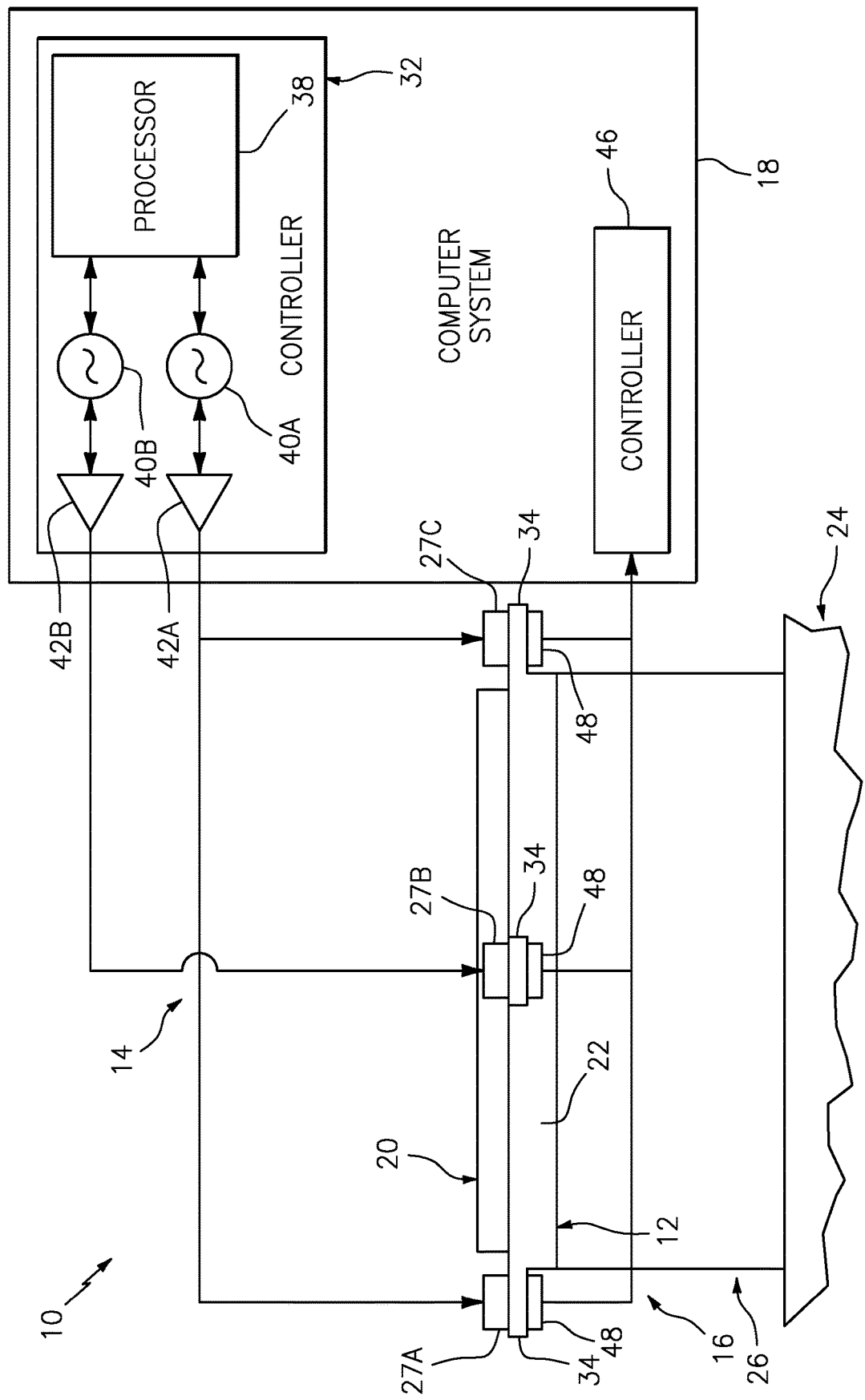
FIG. 5A is a schematic illustration of another system for testing a component such as, for example, a seal element.
Figure 5B:
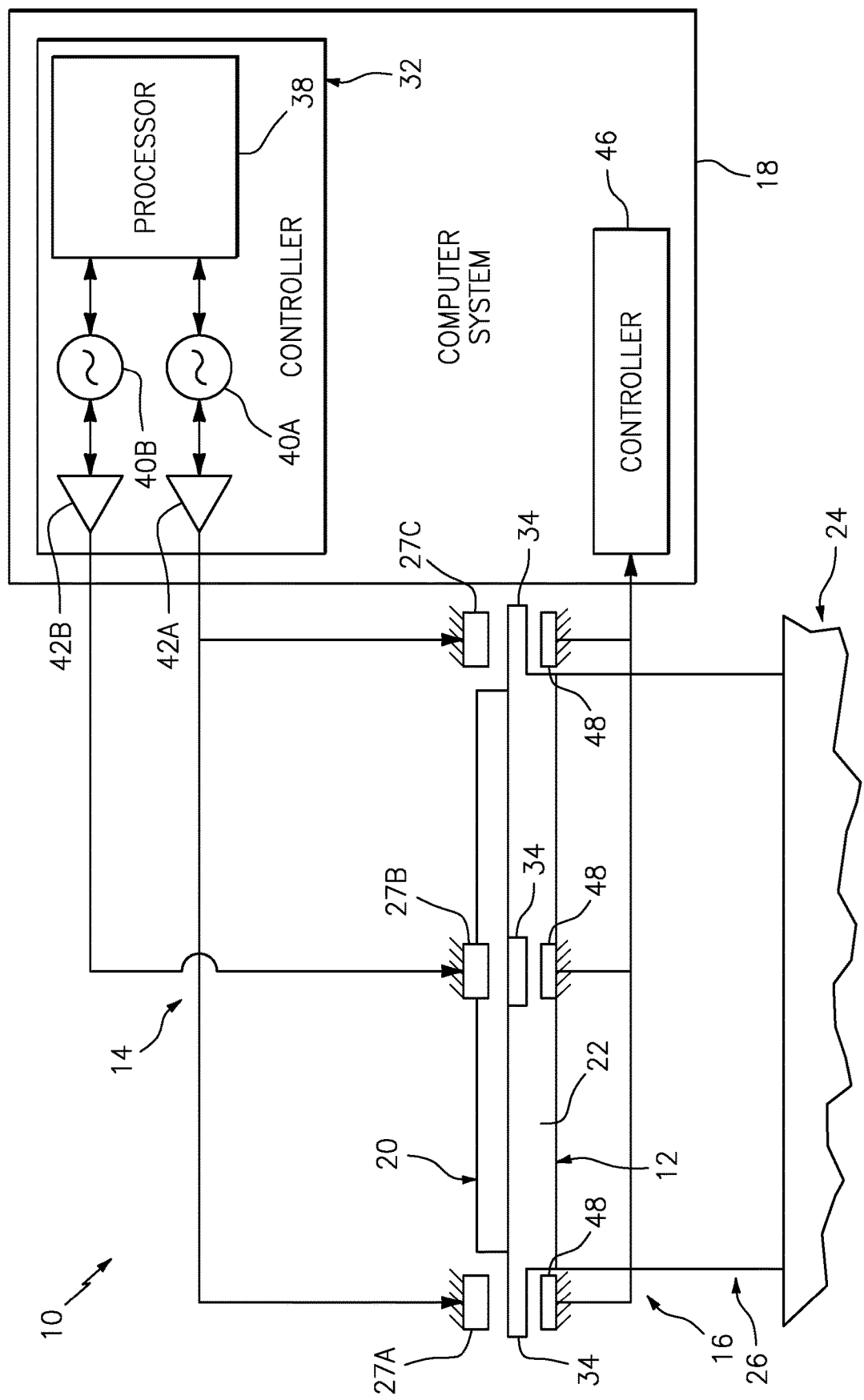
FIG. 5B is a schematic illustration of another system for testing a component such as, for example, a seal element.
Figure 6:
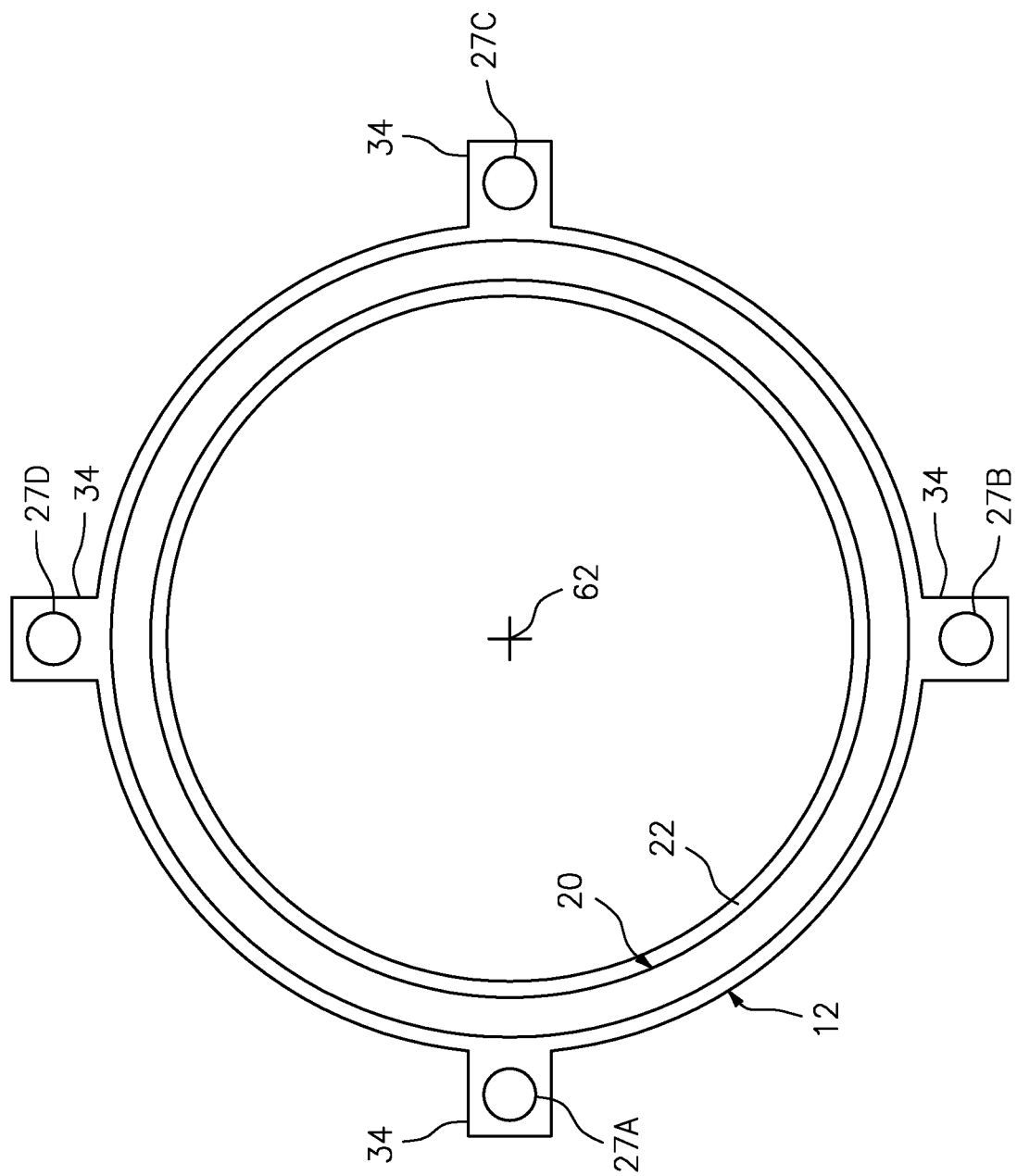
FIG. 6 is a diagrammatic illustration of a portion of the testing system of FIG. 5A.

Similarly as described above with respect to the permanent magnets 28, the excitation devices 27 of FIGS. 5A and 6 may be arranged in an (e.g., annular array). For example, the excitation devices 27 may be respectively arranged at discrete locations circumferentially about the base 22 of the support structure 12. The excitation devices 27 may be configured for rigid connection to the component 20. Each of the excitation devices 27, for example, may be fixedly attached (e.g., bonded) to a respective tab 34 of the support structure 12. In the specific embodiment of FIG. 5A, the excitation devices 27 are disposed on the same side of the support structure 12 as the component 20; however, the present disclosure is not limited to such an exemplary arrangement. However, in other embodiments, one or more or each of the excitation devices 27 may be arranged proximate to, but not contacting and/or otherwise physically engaging, the component 20. For example, the excitation devices 27 may be near but spaced from the component 20 and/or the base 22 as shown as shown in FIG. 5B, and connected (e.g., rigidly mounted) to a (e.g., stationary) support structure. In addition or alternatively, one or more or each of the sensors 48 may be arranged proximate to, but not contacting and/or otherwise physically engaging, the component 20. For example, the sensors 48 may be near but spaced from the component 20 and/or the base 22 as shown in FIG. 5B, and connected (e.g., rigidly mounted) to a (e.g., stationary) support structure.

The exemplary excitation systems 14 described above and illustrated in the drawings include four excitation devices 27. The present disclosure, however, is not limited to including four excitation devices 27. For example, the excitation system 14 may alternatively include one excitation device 27, two excitation devices 27, three excitation devices 27, or more than four excitation devices 27. In one embodiment, for example, the excitation system 14 may include a grouping (e.g., an array) of sixteen electroacoustic transducers (16 channels). In another embodiment, the excitation system 14 may include a grouping (e.g., an array) of eight piezoelectric devices (8 channels). The present disclosure, of course, is not limited to the foregoing exemplary embodiments.

Figure 7:
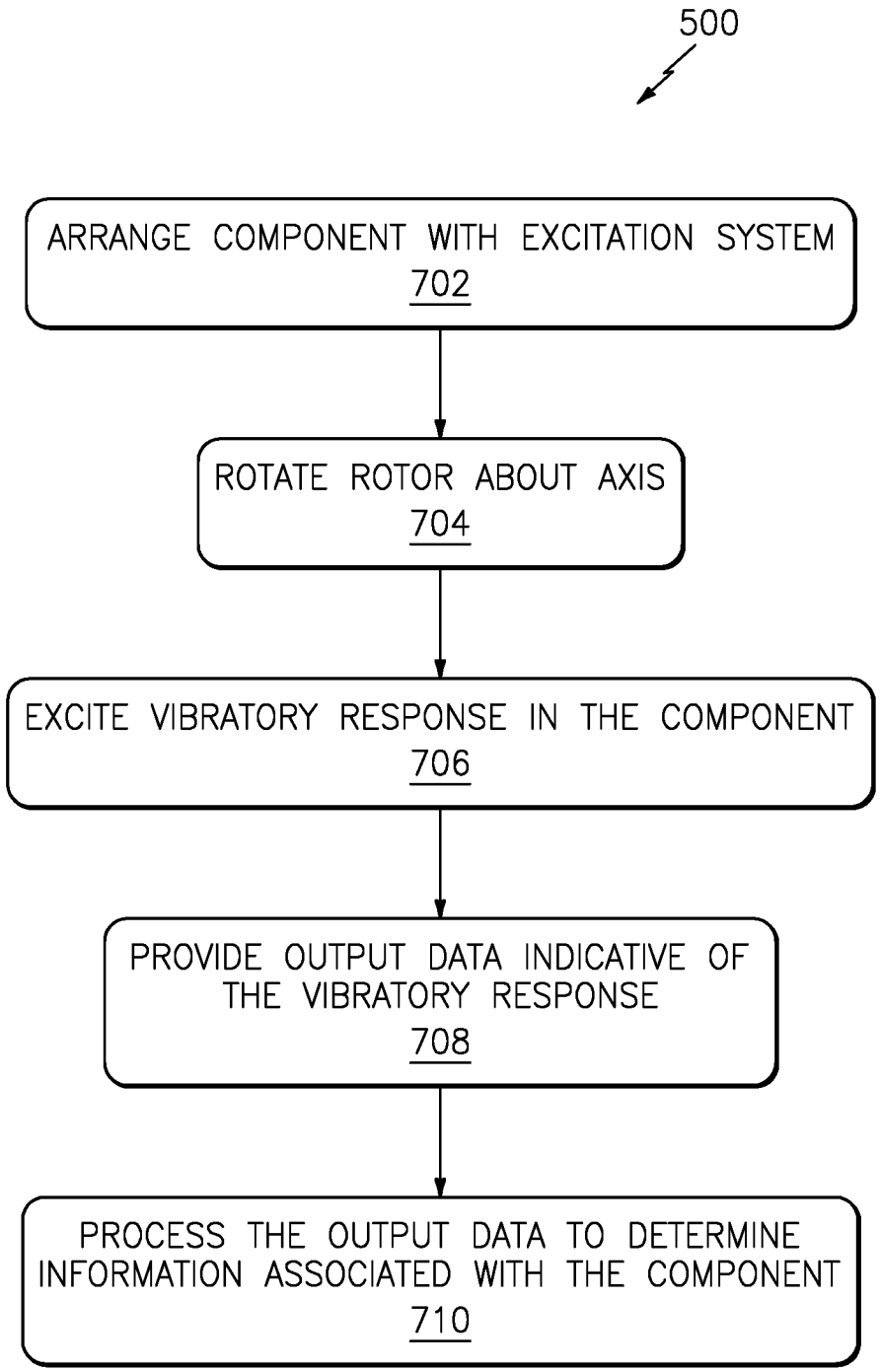
FIG. 7 is a flow diagram of a method for testing a component such as, for example, a seal element.

FIG. 7 is a flow diagram of a method 700 for testing/monitoring a component such as, but not limited to, the component 20 described above. This method 700 may be implemented using a testing system such as, but not limited to, the testing system 10 of FIG. 1 or 5A described above.

Figure 3:
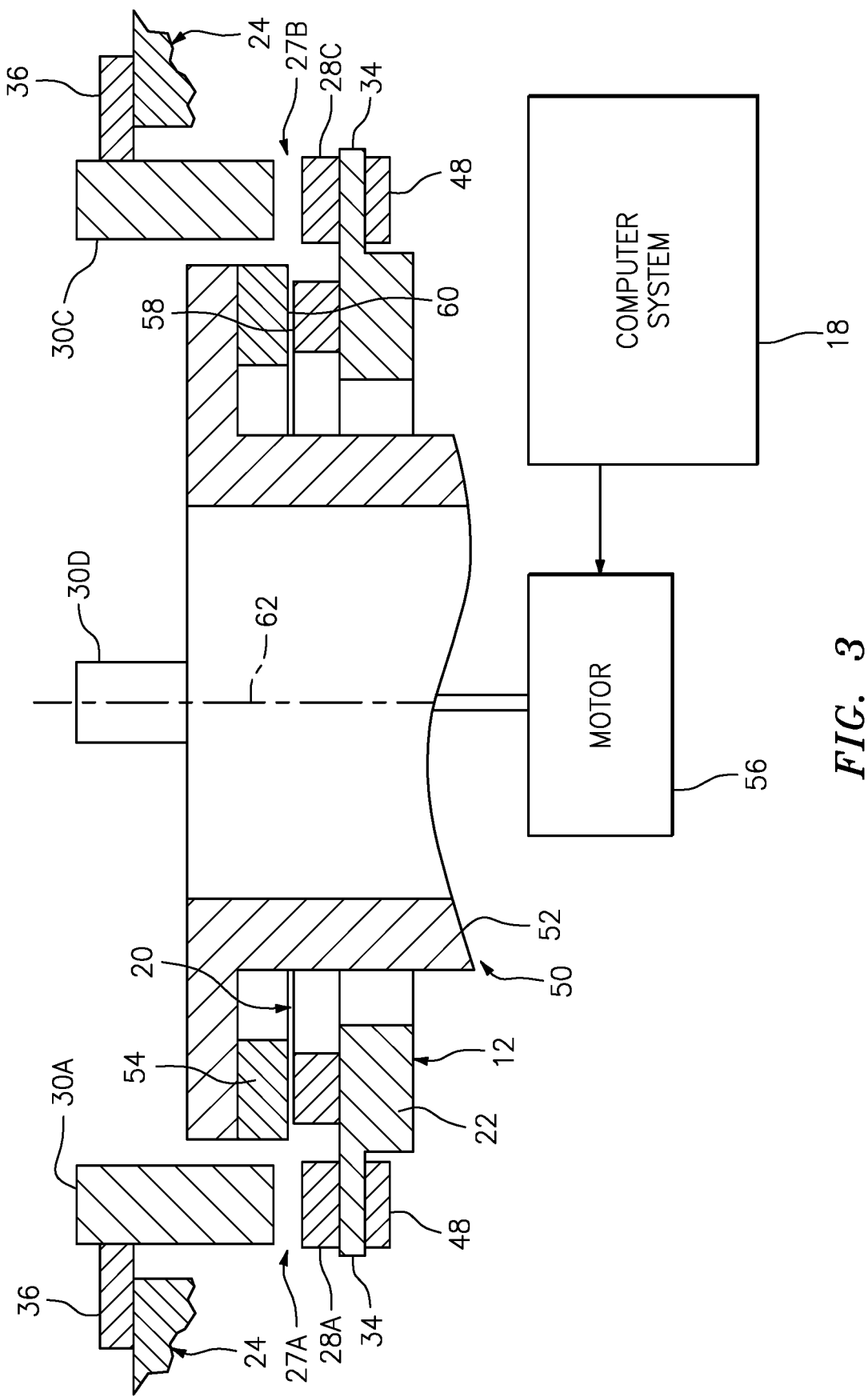
FIG. 3 is a sectional schematic illustration of a portion of the testing system of FIG. 1 further configured with a rotating assembly driven by a motor.

In step 702, the component 20 is arranged with the excitation system 14. The component 20 of FIG. 1 or 5A, for example, is rigidly secured to the base 22 of the support structure 12. In this position, the excitation devices 27 (e.g., permanent magnets 28, electroacoustic transducers or piezoelectric devices) are disposed circumferentially about an outer periphery of the component 20. The excitation devices 27 (e.g., permanent magnets 28, electroacoustic transducers or piezoelectric devices) are also disposed on a common (same) side of the support structure 12 as the component 20; however, the method 700 is not limited to such an exemplary arrangement of elements. Once the component 20 is positioned, a seal surface 58 of the component 20 (e.g., a stationary seal land) is pressed against (or biased towards and in close proximity to) an axially adjacent face surface 60 of the rotor 54 as shown in FIG. 3. Thus, when the component 20 is positioned, the elements 20 and 54 may form a lift off seal system, or another type of seal system depending on the specific configurations of the elements 20 and 54.

In step 704, the rotor 54 is rotated about its axis 62. The rotational speed of the rotor 54 may be substantially constant during an entire test sequence. Alternatively, the rotational speed may be varied between various levels or varied substantially continuously; e.g., varied to simulate engine operation (rotor speed) during flight. While the rotor 54 is rotating about the axis 62, a film of fluid (e.g., a gas such as air, or a liquid such as oil) may be established between the seal system elements 20 and 54 and their surfaces 58 and 60 such that this fluid film functions as a (e.g., wear) buffer between the elements 20 and 54 as well as a seal between the elements 20 and 54. However, in other embodiments, the rotor 54 may be held stationary and/or the component 20 may be mounted to a stationary support.

In step 706, a vibratory response is excited in the component 20. In particular, the excitation system 14 is operated such that each of the excitation devices 27 induces vibrations in the component 20. For example, the excitation system 14 of FIG. 1 may be operated to control a magnetic interaction between each electromagnet 30 and each respective permanent magnet 28. For example, the controller 32 may provide the first control signal 44A to the electromagnets 30A and 30C and the second control signal 44B to the electromagnets 30B and 30D, where there is a phase shift between the first and the second control signals 44A and 44B as shown, for example, in FIG. 4. The strength and the phase of each control signal 44A, 44B may be varied according to a function such as, but not limited to, a sinusoidal function. With such varying control signals 44A and 44B, at time $t_1$, the electromagnets 30A and 30C may have a first (e.g., positive) phase and be respectively attracted to the permanent magnets 28A and 28C. By contrast, at time $t_3$, the electromagnets 30A and 30C may have a second (e.g., negative) phase and be respectively repulsed from the permanent magnets 28A and 28C. Similarly, at time $t_1$, the electromagnets 30B and 30D may have the second phase and be respectively repulsed from the permanent magnets 28B and 28D. By contrast, at time $t_3$, the electromagnets 30B and 30D may have the first phase and be respectively attracted to the permanent magnets 28B and 28D. This oscillating attraction/repulsion between the magnets 28 and 30 may cause the component 20 to move back and forth locally and thereby excite the vibratory response in the component 20.

In another example, referring to the system 10 of FIG. 5A, the controller 32 may provide the first control signal 44A to the excitation devices 27A and 27C (e.g., electroacoustic transducers or piezoelectric devices) and the second control signal 44B to the excitation devices 27B and 27D (e.g., electroacoustic transducers or piezoelectric devices), where there is a phase shift between the first and the second control signals 44A and 44B as described above. The strength and the phase of each control signal 44A, 44B may be varied according to a function such as, but not limited to, a sinusoidal function. With such varying control signals 44A and 44B, at time $t_1$, the excitation devices 27A and 27C may have a first (e.g., positive) phase and may cause at least respective local portions of the component 20 to move in a first direction. By contrast, at time $t_3$, the excitation devices 27A and 27C may have a second (e.g., negative) phase and may cause the respective local portions of the component 20 to move in a second direction, which second direction may be opposite the first direction. Similarly, at time $t_1$, the excitation devices 27B and 27D may have the second phase and may cause at least respective local portions of the component 20 to move in the second direction. By contrast, at time $t_3$, the excitation devices 27B and 27D may have the first phase and may cause the respective local portions of the component 20 to move in the second direction. This oscillating may cause the component 20 to move back and forth locally and thereby excite the vibratory response in the component 20.

In step 708, the sensor system 16 provides output data indicative of the vibratory response in the component 20. The sensors 48 (e.g., accelerometers, strain gages, pressure transducers, microphones, thermocouples, mass flow meters or proximity probes), for example, may measure local vibration related characteristics (e.g., acceleration, movement, strain, etc.) of the component 20 and respectively provide sensor signals to the controller 46 indicative of the measured local vibration related characteristics. The controller 46 combines data from the sensor signals to generate the output data.

In step 710, the computer system 18 processes the output data to determine information about the component 20. For example, the computer system 18 may process the output data to determine one or more structural characteristics of the component 20 and/or one or more dynamic characteristics of the component 20. Using known algorithms, for example, the computer system 18 may process the output data to determine the natural frequency of the component 20, the component's damping characteristics and/or the component's modes of vibration. The computer system 18 may also or alternatively process the output data to compare the sensed (actual) vibratory response of the component 20 to a predicted vibratory response of the component 20 and provide comparison data indicative thereof. Of course, in other embodiments, the step 710 may be performed by one or more additional computer systems that are different from the computer system 18.

In the system and method embodiments described above, one set of the excitation devices 27 (e.g., electromagnets 30, electroacoustic transducers or piezoelectric devices) is phase shifted from the other set excitation devices 27 (e.g., electromagnets 30, electroacoustic transducers or piezoelectric devices). However, in other embodiments, none of the excitation devices 27 may be phase shifted; i.e., all of the excitation devices 27 may have the same phase. In still other embodiments, another set (or sets) of the excitation devices 27 may be phase shifted from each other set of the excitation devices 27; note, each set may include one or more excitation devices 27 (e.g., electromagnets 30, electroacoustic transducers or piezoelectric devices). For example, each excitation devices 27 (e.g., 27A, 27B, 27C and 27D) may be operated with a unique signal phase.

In some embodiments, the excitation devices 27 and/or the sensors 48 are rigidly connected to the component 20 through the support structure 12 as described above. However, in other embodiments, one or more of the excitation devices 27 and/or one or more of the sensors 48 may be rigidly attached directly to the component 20.

While the control signals 44A and 44B are described above as varying according to a function such as a sinusoidal function, the present disclosure is not limited to such an exemplary function. For example, in other embodiments, the function may be a square wave function or any other type of suitable function. Furthermore, while each control signal 44A, 44B is described above as being varied according to the same function, in other embodiments a first control signal may be varied according to a first function and a second control signal may be varied according to a second function, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for testing a component, comprising:
a support structure configured to support the component;
an excitation system including a plurality of excitation devices arranged in an array and configured to excite a vibratory response in the component such that the component vibrates, the plurality of excitation devices at least including a first excitation device, a second excitation device and a third excitation device;
the excitation system configured to respectively control each of the plurality of excitation devices to excite the vibratory response in the component; and
a sensor system configured to output data indicative of the vibratory response;
wherein the excitation system is configured to vary one or more parameters of vibrations induced by the first excitation device according to a function;
wherein the excitation system is further configured to vary one or more parameters of vibrations induced by the second excitation device according to the function; and
wherein the varying of the one or more parameters of the vibrations induced by the first excitation device is out of phase with the varying of the one or more parameters of the vibrations induced by the second excitation device.

2. The system of claim 1, wherein the first excitation device comprises an electroacoustic transducer configured for rigid connection to the component.

3. The system of claim 1, wherein the first excitation device comprises a piezoelectric device configured for rigid connection to the component.

4. The system of claim 1, wherein
the first excitation device includes a permanent magnet associated with an electromagnet;
the permanent magnet is configured for rigid connection to the component; and
the excitation system is configured to control interaction between the electromagnet and the permanent magnet during excitation of the vibratory response.

5. The system of claim 1, wherein
the sensor system comprises a plurality of sensors arranged in an array and configured for rigid connection to the component; and
the sensors are configured to sense the vibratory response of the component.

6. The system of claim 5, wherein the plurality of sensors comprise at least one of an accelerometer, a strain gage, a pressure transducer, a microphone, a thermocouple, a mass flow meter or a proximity probe.

7. The system of claim 1, wherein the support structure comprises a mount for rigidly attaching the component to the support structure.

8. The system of claim 1, further comprising:
a stationary base structure;
the support structure attached to the stationary base structure through a compliant connection.

9. The system of claim 1, wherein the function is a sinusoidal function.

10. The system of claim 1, wherein the one or more parameters comprise at least one of strength of the vibrations, phase of the vibrations or frequency of the vibrations.

11. The system of claim 1, wherein
the excitation system is further configured to vary one or more parameters of vibrations induced by the third excitation device according to the function; and
the varying of the one or more parameters of the vibrations induced by the first excitation device is in phase with the varying of the one or more parameters of the vibrations induced by the third excitation device.

12. The system of claim 1, wherein
the excitation system is further configured to vary one or more parameters of vibrations induced by the third excitation device according to the function; and
the varying of the one or more parameters of the vibrations induced by the third excitation device is out of phase with the varying of the one or more parameters of the vibrations induced by the first excitation device and the varying of the one or more parameters of vibrations induced by the second excitation device.

\* \* \* \* \*